Patented Nov. 20, 1934

1,981,769

UNITED STATES PATENT OFFICE 1,981,769

PLASTIC COMPOSITION

Nicola S. Archetti, Germantown, Pa.

No Drawing. Application June 4, 1932,
Serial No. 615,463

3 Claims. (Cl. 106—23)

This invention relates to plastic compositions and has for its principal object the provision of a plastic made entirely by the cold process and adaptable primarily for the repairing of rubber, leather, or composition articles.

A further object of my invention is to produce a new composition of matter which can be used directly and easily by an unskilled person for the repair of shoes, belting, mats, automobile tires, etc. and which can be used also as a roof covering.

My composition of matter will vary within quite wide limits depending upon the use to which the plastic composition is to be put. For example where the plastic composition is to be used for a roof covering I would incorporate into the compound fillers and strengthening elements which would not be needed with the simpler composition which would be used for repairing a tear or hole in a rubber raincoat. In all of the modifications however the composition is made without the use of sulfur and without any vulcanization being supplied to the trade or to the ultimate consumer in liquid form and in such condition that it will dry thoroughly in less than thirty hours.

In the preparation of my improved composition I take a quantity of rubber which may vary from a few pounds to a ton but is preferably considerably less than the last named figure in order to be received in the mixing machines. I first dissolve the rubber in some solvent preferably one which is free of water and is fireproof, my preference being carbon tetrachloride. Where cost prohibits the use of this preferred chemical, I can naturally use benzol, benzine, gasoline, or any other solvent for rubber which I have always used in the solid cakes in which the pure crude para rubber comes. While a considerable portion of the rubber may be reclaimed rubber, it is my preference to use only the pure para crude rubber as this gives by far the best product.

When I have mixed the rubber and the solvent so as to form a uniform thick paste I add to the mixture some windmill sand which has been coated with white lead paint. The windmill sand is actually a very fine comminuted asbestos and while it could be added directly to the dissolved rubber, I find that my composition is much improved by first coating the particles of the sand with the white lead. The sand or asbestos is somewhat less in volume to the amount of rubber paste, my preference being roughly five parts by weight of rubber paste to three or four parts by weight of the windmill sand. The amount of lead should be kept quite low, just sufficient to coat the asbestos. One method of coating the sand with white lead consists in adding small quantities of the lead to the asbestos and after each addition stirring the mass until the two are thoroughly mixed; this is continued until the mixture has the consistency of an almost dry granular dough. I find that the white lead is useful not only to coat the sand to get it into uniform mix the more quickly, but has the usual effect of accelerating the complete incorporation of all of the ingredients into the final mixture. I next add magnesia which can be added direct but which preferably is first mixed with a drier which reduces the time for the finished material to become hard when used. I have had excellent results omitting the drier but since only a small quantity is used, just enough to wet the magnesia which itself is about one-half as much by weight as the windmill sand, the added cost is less important than the improvement in the finished product. The composition thus far described is excellent for general repair work and for half soling heels, also for any use where a rubber cement would be used but where the composition is to be used for a roof covering I add to the mixture a quantity of very strong fiber, my preference being copper or steel wool. I have tried comminuted leather and other well known fillers but much prefer not to use these, the results from the strong fiber or metal being ever so much greater. Any coloring matter may be used, this following established practice. While I can give no reason for the result I find that the adding to my composition either for general repair work or for roofing, of a small pinch of ordinary Portland cement will improve the product and I much prefer to add this cement even tho the quantity seems too small to have any effect.

I mix the ingredients mentioned in a batch mixing machine such as is used for the mixing of dough or cement and I find that it is very important to have the mixing completely and thoroughly done as this adds enormously to the success of the plastic composition. The time of mixing, however, in a very fine mixer need not be over fifteen minutes. Provided that the materials have been thoroughly mixed so that each is incorporated into the whole, I find that the composition will give a surface which is extremely durable and has enormous wearing qualities while at the same time being highly resilient and will not crack unless subjected to excessive bending.

In using this composition for the repairing of shoe soles I advice that the worn shoe be made absolutely dry and if convenient to do so it is best to roughen the surface and then apply the composition first very lightly to the sole and then adding a further coat or coats after the first application has had a chance to penetrate the minute holes in the leather. The coating should be fairly thick to simulate, as far as possible, the original condition of the shoe. If such a coating be allowed to dry for about thirty hours the new sole will be found to have an exceptionally long life and have all of the advantages of either rubber or leather.

What I claim is:

1. A plastic composition for use in repairing rubber or leather articles comprising a mixture of pure para crude rubber dissolved in a solvent and having thoroughly incorporated therein fine asbestos coated with white lead and magnesia.

2. A plastic composition comprising pure para crude rubber, carbon tetrachloride, fine asbestos coated with white lead, magnesia, a drier, and a filler material consisting of strong fibers.

3. The process of making a plastic composition which consists in dissolving rubber in a rubber solvent, coating asbestos with a light coat of white lead, mixing the dissolved rubber with the coated asbestos and adding magnesia, then thoroughly mixing the ingredients.

NICOLA S. ARCHETTI.